(12) United States Patent
Kakita et al.

(10) Patent No.: US 6,817,557 B2
(45) Date of Patent: Nov. 16, 2004

(54) PROCESS FOR TRANSPORTING, STORING, AND PRODUCING A PARTICULATE WATER-ABSORBENT RESIN

(75) Inventors: Hiroyuki Kakita, Himeji (JP); Tatsuo Maruo, Hyogo (JP); Takumi Hatsuda, Takasago (JP); Yoshio Irie, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 270 days.

(21) Appl. No.: 09/753,677

(22) Filed: Jan. 4, 2001

(65) Prior Publication Data

US 2001/0011123 A1 Aug. 2, 2001

(30) Foreign Application Priority Data

Jan. 20, 2000 (JP) ........................................ 2000-012139

(51) Int. Cl.[7] .............................................. B02C 19/12
(52) U.S. Cl. .......................................... 241/23; 241/30
(58) Field of Search ............................ 428/402; 241/30, 241/23, 65, 100, 25; 209/11; 528/503

(56) References Cited

U.S. PATENT DOCUMENTS

| | | | | |
|---|---|---|---|---|
| 3,650,804 A | * | 3/1972 | Parisi | 427/294 |
| 5,369,148 A | | 11/1994 | Takahashi et al. | 523/315 |
| 5,716,707 A | * | 2/1998 | Mukaida et al. | 428/402 |
| 6,164,455 A | * | 12/2000 | Kakita et al. | 209/11 |

FOREIGN PATENT DOCUMENTS

| | | |
|---|---|---|
| EP | 0855232 | 7/1998 |
| JP | 5-318481 | * 12/1993 |
| JP | 10202187 | 8/1998 |

* cited by examiner

Primary Examiner—Mark Rosenbaum
(74) Attorney, Agent, or Firm—Roylance, Abrams, Berdo & Goodman, L.L.P.

(57) ABSTRACT

The present invention provides: a process for treating a particulate water-absorbent resin, which enables to carry out pulverization stably in a process for producing a particulate water-absorbent resin, and transportation or storage of the particulate water-absorbent resin stably during or after producing the particulate water-absorbent resin, and to prevent contamination of cohered matters of the particulate water-absorbent resin; and involves no or little deterioration of properties. The process for treating a particulate water-absorbent resin is characterized by carrying out at least one selected from the group consisting of: (1) heating at least one portion of a surface getting contact with the particulate water-absorbent resin from the outside, (2) maintaining the temperature of at least one portion of a surface getting contact with the particulate water-absorbent resin at 30 to 150° C., and (3) maintaining the temperature of at least one portion of a surface getting contact with the particulate water-absorbent resin above a temperature that is lower than a temperature of the particulate water-absorbent resin by 20° C.

8 Claims, 2 Drawing Sheets

PROCESS FOR TRANSPORTING, STORING, AND PRODUCING A PARTICULATE WATER-ABSORBENT RESIN

BACKGROUND OF THE INVENTION

A. Technical Field

The present invention relates to a process for treating a particulate water-absorbent resin. Particularly, the present invention relates to an improvement in a process for producing a particulate water-absorbent resin itself, which comprises a step of pulverizing a water-absorbent resin in part of the entire steps, in addition to an improvement in transporting or storing a particulate water-absorbent resin during or after producing the particulate water-absorbent resin. More particularly, the invention relates to processes for pulverizing the water-absorbent resin, and transporting and storing the particulate water-absorbent resin, with high accuracy and productivity. Examples of the water-absorbent resin include water-absorbent resins which are applied to wide uses, for example, as absorbing agents for sanitary materials (e.g. sanitary napkins and disposable diapers), or as water-holding agents and dehydrators in the agricultural and gardening field and the field of civil engineering works.

B. Background Art

A particulate water-absorbent resin is generally used as a powdery particulate product having a particle diameter of 1 millimeter to several tens micronmeters.

Therefore, the particulate water-absorbent resin is produced by drying a hydrogel polymer obtained by polymerizing hydrophilic monomers, and then pulverizing the resultant dry polymer with a pulverizer.

In the above-mentioned pulverization, a cohered matter of the particulate water-absorbent resin adhered inside the pulverizer or to a pipe near an exhaust outlet of the pulverizer. Therefore, it happened that: the pulverizing procedure could not be carried out stably because of causing clogs, and properties of the particulate water-absorbent resin became low because of contaminating the particulate water-absorbent resin with the cohered matter.

The particulate water-absorbent resin obtained as shown above, are changed into a product thereafter by way of a classifying step, a pulverizing step, a blending step for additives, and a surface-treating step. The respective steps are connected by machinery transporting apparatuses which needs little power, or by a pneumatic conveyer usually. The particulate water-absorbent resins also undergo a step of transporting even in a stage after producing the particulate water-absorbent resins, for example, when using the particulate water-absorbent resins. In this step of transporting during or after the production, the cohered matter of the particulate water-absorbent resins adhered to the transporting apparatus. Therefore, it happened that: the transporting procedure could not be carried out stably because of causing clogs, and properties of the particulate water-absorbent resins became low because of contaminating the particulate water-absorbent resins with the cohered matter in the same way as mentioned above.

There were similar problems as mentioned above when storing the particulate water-absorbent resins between the above-mentioned two steps during the production, and storing a final product after the production.

In a process for obtaining particulate water-absorbent resins, the particulate water-absorbent resins are often classified. Then, it happens that there was a similar problem as mentioned above. Therefore, the present inventors filed patent applications (JP-A-202187/1998 and EP 855232) concerning a process for classifying a particulate hydrophilic polymer and a sieving device. The process comprises a step of using the sieving device in a heated and/or thermally insulated state, and enables to classify the particulate hydrophilic polymer in particle size with high accuracy and productivity.

In addition, continuous agglomeration of an absorbent resin powder was described in U.S. Pat No. 5,369,148. In a method of carrying out the continuous agglomeration, a cylindrical member was heated in order to prevent the highly adhesive agglomerate, which has particles of the absorbent resin powder cohesively united with an aqueous liquid, adhering to the cylindrical member. On the other hand, the present invention as described below relates to processes for pulverizing the water-absorbent resin, and transporting and storing the particulate water-absorbent resin, wherein the aimed water-absorbent resin or particulate water-absorbent resin is not adhesive but free-flowing. It is impossible to anticipate that: heating which had effect on preventing the highly adhesive agglomerate adhering, also has effect on the water-absorbent resin or particulate water-absorbent resin which is not adhesive but free-flowing.

SUMMARY OF THE INVENTION

A. Object of the Invention

Thus, an object of the present invention is to provide a process for treating a particulate water-absorbent resin, which enables to carry out the above-mentioned pulverization stably in a process for producing the particulate water-absorbent resin, and the transportation or storage of the particulate water-absorbent resin stably during or after producing the particulate water-absorbent resin, and to prevent the contamination of the cohered matter of the particulate water-absorbent resin; and involves no or little deterioration of properties.

B. Disclosure of the Invention

The present inventors diligently studied about causes of forming the above-mentioned cohered matter. As a result, they found that: the water-absorbent resin as obtained by drying the hydrogel polymer has a water content of about 3 to about 15%, the pulverized particulate water-absorbent resin tends to be aggregated by the water heat-generated in the pulverization of the polymer, and the cohered matter adheres to an internal sidewall of the pulverizer, to parts for the pulverizer, or around the exhaust outlet of the pulverizer. In addition, they also found that: the cohered matter is formed by the water in the same way as mentioned above when the particulate water-absorbent resin having extremely enlarged surface areas by the pulverization is transported or stored.

Therefore, the present inventors found that the above-mentioned problems are solved by using a pulverizer, a transporting apparatus or a storage tank in a heated and/or thermally insulated state in order to inhibit the cohesion caused by the water content of the particulate water-absorbent resin. As a result, the present invention was attained.

Thus, a process for transporting a particulate water-absorbent resin, according to the present invention, comprises a step of transporting a particulate water-absorbent resin obtained by pulverizing a dry water-absorbent resin product, and is characterized by carrying out at least one selected from the group consisting of following (1) to (3) when transporting the particulate water-absorbent resin.

(1) heating at least one portion of a surface getting contact with the particulate water-absorbent resin from the outside, (2) maintaining the temperature of at least one portion of a surface getting contact with the particulate water-absorbent resin at 30 to 150° C., and (3) maintaining the temperature of at least one portion of a surface getting contact with the particulate water-absorbent resin above a temperature that is lower than a temperature of the particulate water-absorbent resin by 20° C.

A process for storing a particulate water-absorbent resin, according to the present invention, comprises a step of storing a particulate water-absorbent resin obtained by pulverizing a dry water-absorbent resin product, and is characterized by carrying out at least one selected from the group consisting of the above-mentioned (1) to (3) when storing the particulate water-absorbent resin.

A process for producing a particulate water-absorbent resin, according to the present invention, comprises a step of pulverizing a dry water-absorbent resin product in order to obtain a particulate water-absorbent resin in part of the entire steps, and is characterized by carrying out at least one selected from the group consisting of the above-mentioned (1) to (3) in the step of pulverizing.

In this way, the present inventors found that the fundamental process described in JP-A-202187/1998 (EP 855232) can be applied to the respective steps of pulverizing, transporting, and storing.

Surprisingly, the above improved processes for transporting and storing can preferably be applied to a particulate water-absorbent resin that is surface-crosslinked and has little water content.

These and other objects and the advantages of the present invention will be more fully apparent from the following detailed disclosure.

Figure 1:
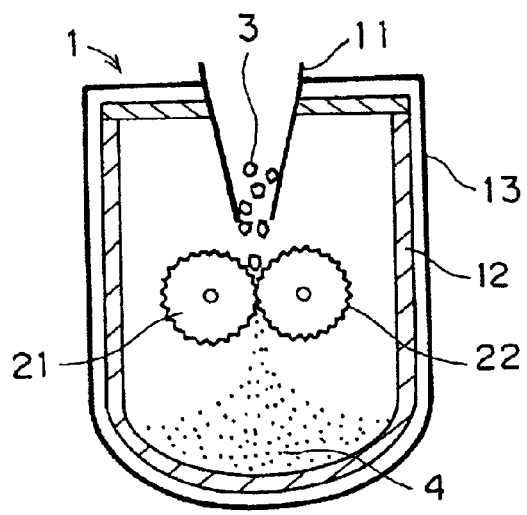
FIG. 1 is a view describing one example of a pulverizer as used in the present invention.

(Explanation of the Symbols):

1: Roll pulverizer
12: Outer frame
13: Steam tracing
3: Dry product
4: Particulate water-absorbent resin
5: Bucket conveyer
51: Chain
52: Bucket
53: Steam tracing
7: Hopper
72: Outer frame
75: Jacket
76: Electric heater

DETAILED DESCRIPTION OF THE INVENTION (Water-absorbent Resin Product):

The dry water-absorbent resin product as used in the present invention is obtained by polymerizing water-soluble monomers containing a polymerizable unsaturated group with crosslinking agents for forming a crosslinked structure in the polymerization. Examples of the water-soluble monomers containing a polymerizable unsaturated group include: anionic monomers, such as (meth)acrylic acid, (anhydrous) maleic acid, fumaric acid, crotonic acid, itaconic acid, 2-(meth)acryloylethanesulfonic acid, 2-(meth)acryloylpropanesulfonic acid, 2-(meth)acrylamido-2-methylpropanesulfonic acid, vinylsulfonic acid, and styrenesulfonic acid, and their salts; monomers containing a nonionic hydrophilic group, such as (meth)acrylamide, N-substituted (meth)acrylamide, 2-hydroxyethyl (meth)acrylate, 2-hydroxypropyl (meth)acrylate, methoxypolyethylene glycol (meth)acrylate, and polyethylene glycol (meth)acrylate; and unsaturated monomers containing an amino group, such as N,N-dimethylaminoethyl (meth)acrylate, N,N-dimethylaminopropyl (meth)acrylate, and N,N-dimethylaminopropyl(meth)acrylamide, and their quaternary products. Examples of the crosslinking agents include: compounds having two or more polymerizable unsaturated double bonds per molecule; compounds having per molecule two or more groups reactive upon a functional group, such as an acid group, a hydroxyl group, and an amino group, of the above-mentioned water-soluble monomers; compounds having one or more unsaturated bonds per molecule as well as one or more groups reactive upon the functional group of the above-mentioned monomers; compounds having two or more sites per molecule reactive upon the functional group of the above-mentioned monomers; or hydrophilic high molecules that are capable of forming a crosslinked structure, for example, through a graft bond, in the polymerization of monomer compositions. Among these, a crosslinked partially-neutralized polycarboxylic acid salt is preferably used because of availability of raw materials. Incidentally, the dry water-absorbent resin product as used in the present invention is preferably a dry product obtained by drying at 160 to 250° C.

The particulate water-absorbent resin handled in the present invention is obtained by pulverizing the above-mentioned dry water-absorbent resin product, and usually has a particle diameter of not greater than 1,000 μm. The particulate water-absorbent resin can be commercially available as a dried and pulverized product. In the present invention, shapes of the particulate water-absorbent resin can be any form such as spherical, cubic, columnar, plate, scale, bar, needle, fibrous, and amorphous shape. The particle diameter of the particulate water-absorbent resin is generally not greater than 1,000 μm, preferably, not greater than 850 μm. The particulate water-absorbent resin handled in the present invention is generally free-flowing powder.

The above-mentioned particulate water-absorbent resin is preferably surface-crosslinked. Examples of methods for treating a surface-crosslinking are disclosed in: JP-A-44627/1982, JP-A-42602/1983, JP-B-18690/1986, JP-A-246403/1992, U.S. Pat. No. 5,422,405, U.S. Pat. No. 5,597,873, EP 450923, EP 450924, WO 99/42494, WO 99/42496, and WO 99/43720. Among these, the methods can preferably be applied to surface-crosslinking with at least a polyhydric alcohol as a component for surface-crosslinking treatment. In this case, the water-absorbent resin has hydrophilicity in many cases because of the polyhydric alcohol remained partially unreacted. The methods can also preferably be applied to producing a particulate water-absorbent resin by using the polyhydric alcohol as a mixing aid and surface-crosslinking with a substance except for the polyhydric alcohol as a crosslinking agent.

(Definition of Heating and Thermally Insulating):

In the present invention, the term "heating" represents positively applying heat. Therefore, the term "a heated state" includes the following cases where: (1) heat is applied to the internal surface of the apparatus such as a pulverizer, a transporting apparatus, and a storage tank from the outside so as to raise to a certain temperature in the initial stage, and thereafter no heat is applied; (2) heat is applied to the internal surface of the apparatus from the outside constantly, not only in the initial stage. The term "thermally insulating" represents preventing the escape of heat without applying heat, in other words, preventing the temperature from lowering. Therefore, the term "a thermally insulated state" represents cases where it is arranged to prevent the escape of heat in manners, for example, by winding a heat insulator around the apparatus, without applying heat. In the present invention, the apparatus may be used both in "a heated state" and "a thermally insulated state," or may jointly use a heat insulator while applying heat positively.

To put the internal surface of the apparatus such as a pulverizer, a transporting apparatus, and a storage tank in a heated state from the outside or thermally insulated state, the apparatus comprising a means to heat or to insulate thermally the internal surface from the outside may be used, or the atmospheric temperature under which the apparatus is placed may be raised. The apparatus comprising a heating means or a thermally insulating means, for example, can be readily produced by providing a conventional apparatus (such as a pulverizer, a transporting apparatus, and a storage tank) with a jacket as the heating means, capable of being heated with electricity or steam, or by winding a tape-type heater as the heating means around a conventional apparatus, or by winding a heat insulator (temperature-keeping material) as the thermally insulating means around a conventional apparatus. These production methods can be of course used in combinations of two or more thereof.

The heat insulator (temperature-keeping material) as used in the present invention is not especially limited, but examples thereof include: fibrous heat insulators made of materials such as asbestos, rock wool, glass wool, and heatproof inorganic fibers; powdery heat insulators made of materials such as calcium silicate and aqueous perlite; foamed heat insulators made of materials such as polystyrene foam, hard urethane foam, and foamed glass; metallic foil heat insulators; and dead-air space heat insulators such as paper honeycombs.

The smaller the particle diameter of the particulate water-absorbent resin becomes, the more easily the cohered matter is produced because the particulate resins adhere to one another. Therefore, the treating process according to the present invention can more preferably be applied to treating particulate water-absorbent resin which include a small water-absorbent resin particle having a particle diameter of smaller than 150 µm.

(Step of Pulverizing):

In the process for producing a particulate water-absorbent resin according to the present invention, the particulate water-absorbent resin is obtained, for example, by polymerizing hydrophilic monomers. The process comprises steps of: drying a hydrogel polymer obtained by the above-mentioned polymerization, and thereafter pulverizing the resultant dry water-absorbent resin product with a pulverizer in order to obtain the particulate water-absorbent resin.

The pulverizer as used in the step of pulverizing, is exemplified with such as a roller mill, a knife mill, a hammer mill, a pin mill, and a jet mill, and comprises a means to heat the internal surface of the pulverizer itself.

The step of pulverizing requires: heating the internal surface of the pulverizer from the outside, maintaining the internal surface temperature of the pulverizer at 30 to 150° C., or maintaining the internal surface temperature of the pulverizer above a temperature that is lower than a temperature of the particulate water-absorbent resin by 20° C. In short, the cohesion in the pulverizer or near the exhaust outlet thereof can be effectively inhibited by adjusting the internal surface temperature of the pulverizer surface getting contact with the particulate water-absorbent resin to an extent that the aggregation of the particulate water-absorbent resin does not occur. In addition, the particulate water-absorbent resin as obtained by the pulverization is inhibited from adhering to the internal surface of the pulverizer and forming large cohered matters. Then, the cohered matters are inhibited from falling off due to the vibration of the pulverizer and contaminating with the resultant product.

The internal surface temperature of the pulverizer is adjusted to preferably 30 to 150° C., more preferably 40 to 90° C., most preferably 50 to 80° C. In case where the internal surface temperature is less than 30° C., the effect of the present invention cannot be produced. On the other hand, in case where the internal surface temperature is more than 150° C., the effect obtained at more than 150° C. is the same effect as obtained at not more than 150° C., and it is not only uneconomical to raise the temperature to such a high one but also undesirable for the apparatus.

The internal surface temperature of the pulverizer is adjusted above a temperature that is lower than a temperature of the particulate water-absorbent resin by 20° C. (more preferably, by 10° C.). When the particulate water-absorbent resin is treated in an industrial scale, there is a case that the temperature of the particulate water-absorbent resin is adjusted to room temperature or more, for example, about 40 to about 150° C., more preferably about 50 to 80° C. in order to ensure fluidity. In case where the internal surface temperature of the pulverizer is adjusted at or below a temperature lower than a temperature of the particulate water-absorbent resin by 20° C., the particulate water-absorbent resin standing in a heated state is cooled with the internal surface of the pulverizer, so the cohered matters might adhere to the internal surface of the pulverizer to form large cohered matters which then fall off due to the vibration of the pulverizer to contaminate into the resultant product.

The pulverizer as used in the present invention comprises the aforementioned heating means, and is useful for the above-mentioned step of pulverizing the water-absorbent resin.

(Step of Transporting):

The process for transporting according to the present invention, comprises a step of transporting the above-mentioned dry particulate water-absorbent resin by use of a transporting apparatus during or after the production of the particulate water-absorbent resin.

The transporting apparatus as used in the step of transporting, is exemplified with a belt conveyer, a screw conveyer, a chain conveyer, a vibrational conveyer and a pneumatic conveyer, and comprises a means to heat and/or to insulate thermally the internal surface of the transporting apparatus from the outside. Among these transporting apparatuses, it is preferable to use a chain conveyer or pneumatic conveyer.

This step of transporting requires: heating and/or thermally insulating the internal surface of the transporting apparatus from the outside, maintaining the internal surface temperature of the transporting apparatus at 30 to 150° C., or maintaining the internal surface temperature of the transporting apparatus above a temperature that is lower than a temperature of the particulate water-absorbent resin by 20° C. In short, the cohesion in the transporting apparatus can be effectively inhibited by adjusting the internal surface temperature of the transporting apparatus surface getting contact with the particulate water-absorbent resin to an extent that the aggregation of the particulate water-absorbent resin does not occur. In addition, the particulate water-absorbent resin in the transporting process is inhibited from adhering to the internal surface of the transporting apparatus and forming large cohered matters. Then, the cohered matters are inhibited from falling off due to the vibration of the transporting apparatus and contaminating with the resultant product.

The internal surface temperature of the transporting apparatus is adjusted to preferably 30 to 150° C., more preferably 40 to 90° C. In case where the internal surface temperature is less than 30° C., the effect of the present invention cannot be produced. On the other hand, in case where the internal surface temperature is more than 150° C., the effect obtained at more than 150° C. is the same effect as obtained at not more than 150° C., and it is uneconomical to raise the temperature to such a high one.

The internal surface temperature of the transporting apparatus is adjusted above a temperature that is lower than a temperature of the particulate water-absorbent resin by 20° C. (more preferably, by 10° C.). When the particulate water-absorbent resin is treated in an industrial scale, there is a case that the temperature of the particulate water-absorbent resin is adjusted to room temperature or more, for example, about 40 to about 100° C., more preferably about 50 to 80° C. in order to ensure fluidity. In case where the internal surface temperature of the transporting apparatus is adjusted at or below a temperature lower than a temperature of the particulate water-absorbent resin by 20° C., the particulate water-absorbent resin standing in a heated state is cooled with the internal surface of the transporting apparatus, so the cohered matters might adhere to the internal surface of the transporting apparatus to form large cohered matters which then fall off due to the vibration of the transporting apparatus to contaminate into the resultant product. In addition, the capacity of the particulate water-absorbent resin might be lowered because of exposing the particulate water-absorbent resin in a state where the particulate water-absorbent resin is easily affected by shear which is accompanied by the transportation.

Incidentally, it should be avoided that the properties of the particulate water-absorbent resin is changed by the heating and/or the thermally insulating. It is necessary to determine the temperature of the heated state and/or the thermally insulated state, in consideration of kinds of the particulate water-absorbent resin as used and a staying time of the particulate water-absorbent resin in the transporting apparatus.

The process for transporting according to the present invention, can be utilized in a factory where the particulate water-absorbent resin is produced. In addition, in case water-absorbent resins are utilized for wide uses, the process can preferably be utilized in a factory where sanitary materials (e.g. sanitary napkins and disposable diapers) are produced.

It is a loss to deteriorate the capacities of the particulate water-absorbent resin having an improved absorption capacity under a load by the surface-crosslinking treatment because of defective handling. Therefore, the present process for transporting is preferably applied to such a particulate water-absorbent resin having absorption capacity under a load of not less than 18 g/g, preferably not less than 21 g/g.
(Step of Storing):

The process for storing according to the present invention, comprises a step of storing the above-mentioned dry particulate water-absorbent resin by use of a storage tank during or after the production of the particulate water-absorbent resin.

The storage tank as used in this step of storing, is exemplified with a silo and a hopper, and comprises a means to heat the internal surface of the storage tank. When using the particulate water-absorbent resin, a storage tank having an internal surface made of metal such as steel and stainless steel is preferable in consideration of abrasiveness and electrification properties of the particulate water-absorbent resin.

This step of storing requires: heating the internal surface of the storage tank from the outside, maintaining the internal surface temperature of the storage tank at 30 to 150° C., or maintaining the internal surface temperature of the storage tank above a temperature that is lower than a temperature of the particulate water-absorbent resin by 20° C. In short, the cohesion in the storage tank can be effectively inhibited by adjusting the internal surface temperature of the storage tank surface getting contact with the particulate water-absorbent resin to an extent that the aggregation of the particulate water-absorbent resin does not occur. In addition, the particulate water-absorbent resin is inhibited from adhering to the internal surface of the storage tank and forming large cohered matters. Then, the cohered matters are inhibited from falling off due to the vibration of the storage tank and contaminating with the resultant product.

The internal surface temperature of the storage tank is adjusted to preferably 30 to 150° C., more preferably 40 to 90° C., most preferably 50 to 80° C. In case where the internal surface temperature is less than 30° C., the effect of the present invention cannot be produced. On the other hand, in case where the internal surface temperature is more than 150° C., the effect obtained at more than 150° C. is the same effect as obtained at not more than 150° C., and it is uneconomical to raise the temperature to such a high one.

The internal surface temperature of the storage tank is adjusted above a temperature that is lower than a temperature of the particulate water-absorbent resin by 20° C. (more preferably, by 10° C.). When the particulate water-absorbent resin is treated in an industrial scale, there is a case that the temperature of the particulate water-absorbent resin is adjusted to room temperature or more, for example, about 40 to about 150° C., more preferably about 50 to 80° C. in order to ensure fluidity. In case where the internal surface temperature of the storage tank is adjusted at or below a temperature lower than a temperature of the particulate water-absorbent resin by 20° C., the particulate water-absorbent resin standing in a heated state is cooled with the internal surface of the storage tank, so the cohered matters might adhere to the internal surface of the storage tank to form large cohered matters which then fall off due to the vibration of the storage tank to contaminate into the resultant product. In addition, the capacity of the particulate water-absorbent resin might be lowered because of exposing the particulate water-absorbent resin in a state where the particulate water-absorbent resin is easily affected by shear which is accompanied by exhausting the particulate water-absorbent resin from the storage tank.

Incidentally, it should be avoided that the properties of the particulate water-absorbent resin is changed by the heating and/or the thermally insulating. It is necessary to determine the temperature of the heated state and/or the thermally insulated state, in consideration of kinds of the particulate water-absorbent resin as used and a staying time of the particulate water-absorbent resin in the storage tank.

The process for storing according to the present invention, can be utilized in a factory where the particulate water-absorbent resin is produced. In addition, in case water-absorbent resins are utilized for wide uses, the process can preferably be utilized in a factory where sanitary materials (e.g. sanitary napkins and disposable diapers) are produced.

It is a loss to deteriorate the capacities of the particulate water-absorbent resin having an improved absorption capacity under a load by the surface-crosslinking treatment because of defective handling. Therefore, the present process for storing is preferably applied to such a particulate water-absorbent resin having absorption capacity under a load of not less than 18 g/g, preferably not less than 21 g/g.

(Effects and Advantages of the Invention):

The process according to the present invention, enables to carry out pulverizing the water-absorbent resin, and transporting or storing the particulate water-absorbent resin stably, and to prevent the contamination of the cohered matter of the particulate water-absorbent resin; and involves no or little deterioration of properties.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples. In addition, in the examples, unless otherwise noted, the units "%" and "part(s)" denote those by weight. Incidentally, various properties of the water-absorbent resin were measured by the below-mentioned measurement methods.

(1) Water Absorption Capacity:

First, 0.2 g of water-absorbent resin was uniformly placed into a tea bag type bag (60×60 mm) and the opening portion of the bag was heat-sealed, and then the bag was immersed into a 0.9 wt % aqueous sodium chloride solution (physiological saline solution). Sixty minutes later, the bag was drawn up and the amount (W1 [g]) of the bag was measured after removing water by use of a centrifugal separator (250 G (250×9.81 m/sec$^2$), 3 minutes). In addition, the same procedure is carried out without using the water-absorbent resin, and then the amount (W0 [g]) of the bag was measured. The water absorption capacity (g/g) of the water-absorbent resin was calculated from these weights W1 and W0, and the following equation (a):

Water absorption capacity (g/g)=(W1−W0)/(weight (g) of water-absorbent resin).

(2) Water-Soluble Content:

First, 0.50 g of water-absorbent resin was dispersed into 1,000 ml of deionized water and then stirred with a magnetic stirrer for 16 hours. Then, the resultant swollen gel was separated and filtrated with a filter paper. Next, the amount of water-soluble polymers into the resultant filtrate as obtained was determined by carrying out colloidal titration. The water-soluble content is represented by weight % of the water-absorbent resin.

(3) Absorption Capacity Under Load:

The absorption capacity under a load is calculated from the weight of the physiological saline solution absorbed by water-absorbent resin under a load of 4.9 kPa (50 g/cm$^2$) for 60 minutes. The detailed measurement method thereof is described in JP-A-302391/1999 (EP 855232).

EXAMPLE 1

Acrylic acid partially sodium salt, of which 70 mol % was neutralized, was subjected to an aqueous solution polymerization together with trimethylolpropane triacrylate to obtain a hydrogel polymer of a water-absorbent resin, which was then subjected to rough pulverization. This resultant polymer was placed and spread thinly on a porous plate of a band dryer, and was blow dried at 180° C. A cohered dry product 3 was obtained at an outlet of the dryer. The dry product 3 was supplied to a roll pulverizer 1 (made by Asano Tekkosho) as shown in FIG. 1 with a supplying speed of 100 kg/h, and was pulverized for 8 hours, thus obtaining a particulate water-absorbent resin 4 which has a temperature of about 60° C.

The roll pulverizer 1 comprises an outer frame 12 with an inlet 11, and a pair of rolls 21 and 22 placed in the outer frame 12. A steam tracing 13 is wound around all over the outer frame 12, and is further covered with a thermomat (not shown) as a temperature-keeping material. The dry product 3 obtained by the rough pulverization is supplied between the rolls 21 and 22 from top through the inlet 11 of the outer frame 12. The pressure of steam was 0.2 MPa. The internal surface temperature of the outer frame of the roll pulverizer was 75° C. Troubles did not happen in the pulverizing procedure for 8 hours.

COMPARATIVE EXAMPLE 1

The same procedure as of Example 1 was carried out except that: the roll pulverizer was used without the steam tracing and the temperature-keeping material, and the internal surface temperature of the outer frame of the roll pulverizer was 25° C. The pulverizer began to make an extraordinary noise after 2 hours from starting the pulverization, and cohered particles were contaminated into the particulate water-absorbent resin as obtained at the outlet of the pulverizer.

EXAMPLE 2

Figure 2:
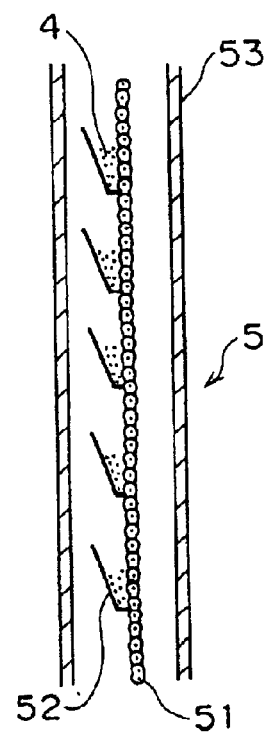
FIG. 2 is a view describing one example of a transporting apparatus as used in the present invention.

The powder of the particulate water-absorbent resin 4 at about 60° C., as obtained in Example 1, was transported for a distance of 10 m with a bucket conveyer 5 as shown in FIG. 2. The bucket conveyer 5 comprises a chain 51 with a bucket 52 at regular intervals, and a steam tracing 53 in order to cover these chain and buckets. The steam tracing 53 is further covered with a temperature-keeping material (not shown). In the bucket conveyer 5, the bucket 52 moves with moving the chain 51. The powder was transported for 10 hours with adjusting the internal surface temperature of the steam tracing 53 at 60° C. However, cohered matters of the particulate water-absorbent resin 4 did not formed in the transporting procedure.

COMPARATIVE EXAMPLE 2

The same procedure as of Example 2 was carried out for about 9 hours except that: the steam was not streamed into the steam tracing. Materials adhered to an internal portion of the bucket increasingly with the passage of time, and loads of a motor in order to move the chain became large. When about 9 hours passed, the bucket conveyer was stopped because it was considered that the motor would burn out if the conveyer continued to be driven further.

EXAMPLE 3

The powder of the particulate water-absorbent resin 4 at about 60° C., as obtained in Example 1, was classified with a sieving device which comprised a screen mesh surface with sieve meshs of 850 μm and 150 μm, and was covered with a temperature-keeping material, thus obtaining the particulate water-absorbent resin 4 (No. 1) which almost had a particle size of not greater than 850 μm and not smaller than 150 μm. Properties (average values) of the particulate water-absorbent resin 4 (No. 1) were as mentioned below:

Water Absorption capacity: 50 g/g, Water-soluble content: 20 weight %,
   Amount on 14 mesh (1180 μm): 0%,
   Amount on 20 mesh (850 μm): 0%,
   Amount on 100 mesh (150 μm): 98%, and
   Amount passed through 100 mesh (150 μm): 2%.

Figure 3:
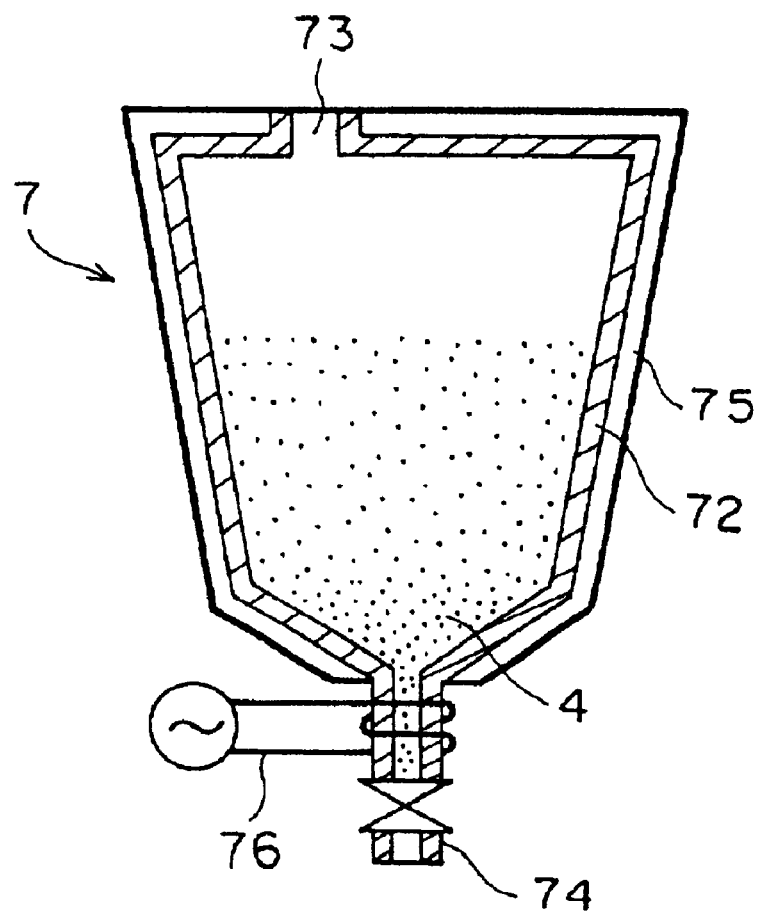
FIG. 3 is a view describing one example of a storage tank as used in the present invention.

This particulate water-absorbent resin 4 (No. 1) was charged into a hopper 7 as shown in FIG. 3. The hopper 7 comprises an outer frame 72, an inlet 73, an extract outlet 74, a jacket to cover the outer frame, an electric heater 76, and a bag filter (not shown). The whole of the hopper is thermally insulated by streaming warm water of 60° C. into the jacket 75, and the hopper has a structure of maintaining the internal surface temperature of the outer frame 72 at 60° C. The portion near the extract outlet 74 is further heated by the electric heater 76. About ten tons of the particulate water-absorbent resin 4 was charged in the hopper 7. On the next day, 20 kg of the particulate water-absorbent resin 4 was charged each into a paper bag with extracting the particulate water-absorbent resin 4 from the extract outlet 74 (The extracting temperature of the particulate water-absorbent resin was about 52° C.). The extracting procedure was carried out smoothly, and properties (average values) of the particulate water-absorbent resin 4 (No. 2) charged in the paper bag were as mentioned below:

Water Absorption capacity: 50 g/g, Water-soluble content: 20 weight %,
   Amount on 14 mesh (1180 μm): 0%,
   Amount on 20 mesh (850 μm): 0%,
   Amount on 100 mesh (150 μm): 98%, and
   Amount passed through 100 mesh (150 μm): 2%.

COMPARATIVE EXAMPLE 3

The same procedure as of Example 3 was carried out except that: the warm water and the electric heater were not used. In the middle of the extracting procedure, the particulate water-absorbent resin 4 was not extracted any more. It seemed that a bridge occurred in the hopper 7. In addition, cohered matters were observed in the particulate water-absorbent resin 4 (No. 3) charged in the paper bag.

Properties (average values) of the particulate water-absorbent resin 4 (No. 3) were as mentioned below:

Water Absorption capacity: 49 g/g, Water-soluble content: 19 weight %,
   Amount on 14 mesh (1180 μm): 2%,
   Amount on 20 mesh (850 μm): 3%,
   Amount on 100 mesh (150 μm): 94%, and
   Amount passed through 100 mesh (150 μm): 1%.

EXAMPLE 4

First, 100 parts of the water-absorbent resin 4 (No. 2) of Example 3, and 5.03 parts of an aqueous solution containing a crosslinking agent, which consisted of: 0.03 parts of ethylene glycol diglycidyl ether, 1 part of propylene glycol, 3 parts of water and 1 part of isopropyl alcohol, were blended with a high-speed mixer. Thereafter, the resultant mixture was heated with a paddle dryer continuously. The material temperature at an outlet of the dryer was about 195° C.

Properties (average values) of the water-absorbent resin 4 (No. 4) as obtained were as mentioned below:

Water Absorption capacity: 34 g/g, Water-soluble content: 18 weight %,
   Amount on 14 mesh (1180 μm): 0%,
   Amount on 20 mesh (850 μm): 0%,
   Amount on 100 mesh (150 μm): 97%,
   Amount passed through 100 mesh (150 μm): 3%, and
   Absorption capacity under a load: 24 g/g.

EXAMPLE 5

The powder of the particulate water-absorbent resin 4 (No. 4) at about 60° C., as obtained in Example 1, was transported with the bucket conveyer 5 as shown in FIG. 2 in the same way as of Example 2. The powder was transported for 10 hours with adjusting the internal surface temperature of the steam tracing 53 at 60° C. However, cohered matters of the particulate water-absorbent resin 4 (No. 4) did not formed in the transporting procedure.

Properties (average values) of the water-absorbent resin 4 (No. 5) as transported were as mentioned below:

Water Absorption capacity: 34 g/g, Water-soluble content: 18 weight %,
   Amount on 14 mesh (1180 μm): 0%,
   Amount on 20 mesh (850 μm): 0%,
   Amount on 100 mesh (150 μm): 97%,
   Amount passed through 100 mesh (150 μm): 3%, and
   Absorption capacity under a load: 24 g/g.

COMPARATIVE EXAMPLE 5

The same procedure as of Example 5 was carried out for about 10 hours except that: the steam was not streamed into the steam tracing. Materials adhered to an internal portion of the bucket increasingly with the passage of time, and loads of a motor in order to move the chain became large. When about 10 hours passed, the bucket conveyer was stopped because it was considered that the motor would burn out if the conveyer continued to be driven further.

Properties (average values) of the water-absorbent resin 4 (No. 6) as sampled when 9 hours passed, were as mentioned below:

Water Absorption capacity: 32 g/g, Water-soluble content: 17 weight %,
   Amount on 14 mesh (1180 μm): 1%,
   Amount on 20 mesh (850 μm): 3%,
   Amount on 100 mesh (150 μm): 94%,
   Amount passed through 100 mesh (150 μm): 2%, and
   Absorption capacity under a load: 21 g/g.

EXAMPLE 6

About ten tons of the particulate water-absorbent resin 4 (No. 5) was charged into a hopper 7 as shown in FIG. 3 in the same way as of Example 3. On the next day, 20 kg of the particulate water-absorbent resin 4 was charged each into a paper bag with extracting the particulate water-absorbent resin 4 from the extract outlet 74 (The extracting temperature of the particulate water-absorbent resin was about 50° C.). The extracting procedure was carried out smoothly, and properties (average values) of the particulate water-absorbent resin 4 (No. 7) charged in the paper bag were as mentioned below:

Water Absorption capacity: 34 g/g, Water-soluble content: 18 weight %,
Amount on 14 mesh (1180 μm): 0%,
Amount on 20 mesh (850 μm): 0%,
Amount on 100 mesh (150 μm): 97%,
Amount passed through 100 mesh (150 μm): 3%, and
Absorption capacity under a load: 24 g/g.

COMPARATIVE EXAMPLE 6

The particulate water-absorbent resin 4 (No. 5) was charged into the paper bag in the same way as of Example 6, except that the warm water in the jacket 75 was exhausted and the electric heater 76 was switched off. Properties (average values) of the particulate water-absorbent resin 4 (No. 8) as sampled from a paper bag in the neighborhood of the last charged paper bag among about 10 t as charged, were as mentioned below:

Water Absorption capacity: 34 g/g, Water-soluble content: 18 weight %,
Amount on 14 mesh (1180 μm): 1%,
Amount on 20 mesh (850 μm): 3%,
Amount on 100 mesh (150 μm): 94%,
Amount passed through 100 mesh (150 μm): 2%, and
Absorption capacity under a load: 22 g/g.

EXAMPLE 7

Exhaust gas containing a particulate powder from the roll pulverizer as used in Example 1, was sucked into a bag filter through a pipe (not shown). The particulate powder was in a state of transporting to the bag filter pneumatically. The steam tracing is wound around this pipe (having an inner diameter of about 8 cm), and the pulverizing procedure of Example 1 was carried out with maintaining the pipe temperature at 70° C. The procedure could continue for 4 days without trouble especially.

COMPARATIVE EXAMPLE 7

The same procedure as of Example 7 was carried out except that: the steam was not streamed into the steam tracing. When about 50 hours passed, the exhaust could not be carried out enough, the particulate powder leaked out of the apparatus and the procedure was stopped. When the pipe was examined, plenty of the particulate water-absorbent resins adhered inside.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for storing a particulate free-flowing water-absorbent resin, which comprises a step of storing a particulate water-absorbent resin in a storage apparatus where said particulate water-absorbent resin is obtained by pulverizing a dry water-absorbent resin product,
   with the process for storing being characterized by all of the steps of:
   (1) heating at least one portion of a surface of said storage apparatus making contact with the particulate water-absorbent resin, where said storage apparatus is heated from the outside,
   (2) maintaining the temperature of at least one portion of said surface of a storage apparatus making contact with the particulate water-absorbent resin where said surface is at a temperature of 30 to 150° C., and
   (3) maintaining the temperature of at least one portion of a surface of said storage apparatus making contact with the particulate water-absorbent resin where said surface is at a temperature above a temperature that is lower than a temperature of the particulate water-absorbent resin by 20° C.,
   when storing the particulate water-absorbent resin.

2. A process for storing a particulate water-absorbent resin according to claim 1, wherein the particulate water-absorbent resin is a surface-crosslinked particulate water-absorbent resin.

3. A process for storing a particulate water-absorbent resin according to claim 2, wherein the surface-crosslinked particulate water-absorbent resin contains at least a polyhydric alcohol.

4. A process for storing a particulate water-absorbent resin according to claim 2 wherein an absorption capacity of the surface-crosslinked particulate water-absorbent resin under a load is not less than 18 g/g.

5. A process for storing a particulate water-absorbent resin according to claim 1, wherein the particulate water-absorbent resin is a crosslinked partially-neutralized polycarboxylic acid salt.

6. A process for storing a particulate water-absorbent resin according to claim 1, wherein the dry water-absorbent resin product is a dry product obtained by drying at 160 to 250° C.

7. A process for storing a particulate water-absorbent resin according to claim 1, wherein the particulate free-flowing water-absorbent resin has a water content of 3% to 15%.

8. A process for storing a particulate water-absorbent resin according to claim 1, wherein said particulate free-flowing water-absorbent resin has a particle diameter of not greater than 1000 μm.

* * * * *